Feb. 12, 1952          O. MAKKONEN          2,585,808
WATER PURIFICATION APPARATUS
Filed Nov. 25, 1949                              2 SHEETS—SHEET 1
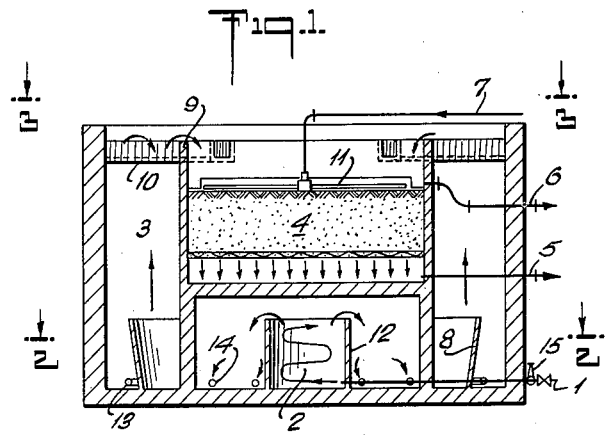
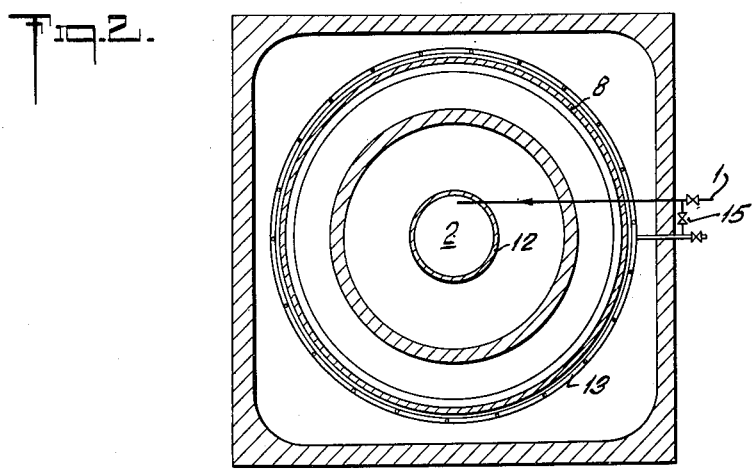
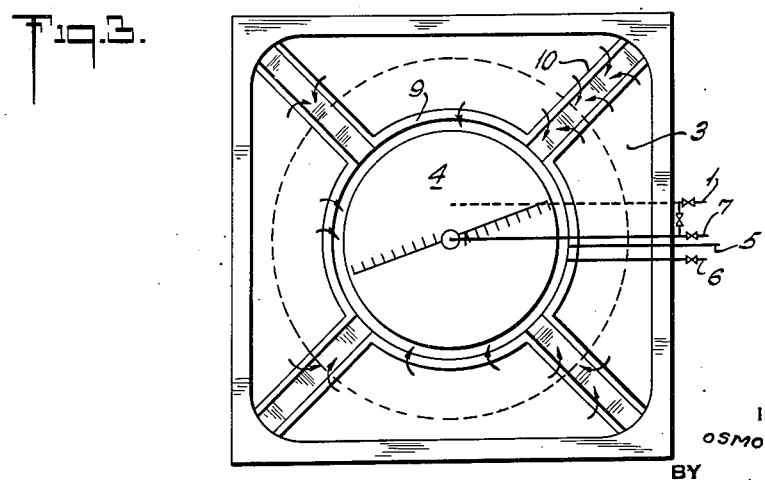
INVENTOR
OSMO MAKKONEN
BY Feb. 12, 1952     O. MAKKONEN     2,585,808
WATER PURIFICATION APPARATUS
Filed Nov. 25, 1949     2 SHEETS—SHEET 2
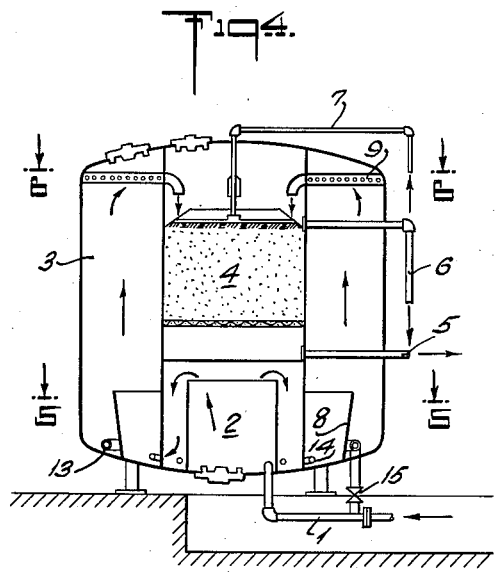
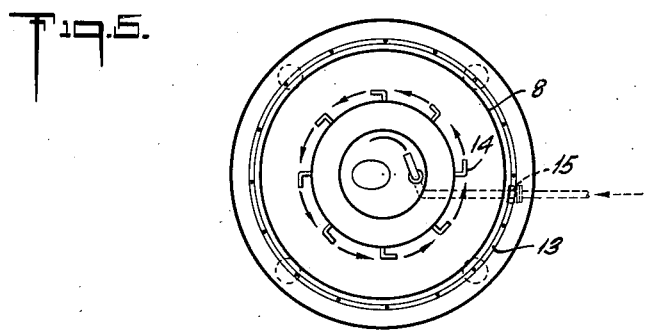
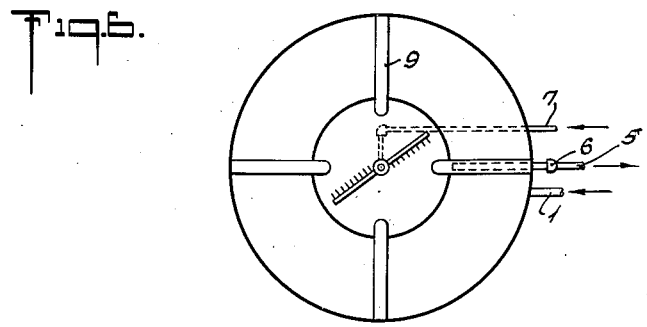
INVENTOR
OSMO MAKKONEN
BY Patented Feb. 12, 1952

2,585,808

UNITED STATES PATENT OFFICE 2,585,808

WATER PURIFICATION APPARATUS

Osmo Makkonen, Helsinki, Finland

Application November 25, 1949, Serial No. 129,242
In Finland November 27, 1948

2 Claims. (Cl. 210—16)

Modern industrial plants employ purifiers in ever increasing numbers to remove, by chemical methods, undesirable substances from raw water. Ever increasing demands are also set on a good many municipal water supplies. One of the various methods which has long been practised is to continuously conduct the water preliminarily freed of impurities by chemical means and treated with chemicals into horizontal or vertical reaction tanks in which the water is stirred by power-driven water moving members. In this way the water is brought into rotary motion whereby the fine and light non-settleables are coalesced or coagmented into flocculi capable of sedimentation. Then, generally, the water is conducted into a horizontal, open settling unit and therefrom into separated sand filters.

While the water purification method according to the present invention also comprises the three steps above mentioned, i. e., the reaction step, the clarification step and the filtering step, these steps are carried out in an apparatus constructed so as to form a single unit and comprising an open or closed tank, a reaction zone in said tank in the central lower part thereof, a clarification zone encircling said reaction zone, and a filter overlying said reaction zone. No liquid moving members or revolving agitators are provided in the reaction zone, but water is vigorously mixed and caused to move by introducing the water admixed with requisite chemicals tangentially into a cylindrical construction open at the top and arranged in the central part of the said zone. The progressively diminishing rotary motion of the water continues on the exterior side of the cylindrical construction and has an extremely advantageous effect on flocculation. From the reaction zone the water passes to an encircling clarification zone wherein the rotary motion is still maintained though appreciably much weaker than in the reaction zone but strong enough to prevent precipitation. To effect clarification the rising water is filtered through a suspended sludge filter forming in the central part of the clarification zone. As the velocity of the upwardly rising water is maintained lower than the settling rate of the sludge or solids, water comparatively clear separates at the upper portion of said clarification zone and passes directly therefrom into a sand filter over the upper edge thereof which functions as a weir. In this manner the use of long channels and conduits which tend to break up the flocs drifting with clarified water and thus hindering filtration is avoided. Within the bottom portion of the clarification zone is disposed an outwardly expanding conical ring element. In consequence of the rotary motion of the water and the upward flow velocity as compared with the velocity in the upper part of the clarification zone the flocs do not settle within the said conical ring element but on the exterior side thereof where a concentrated sludge skin forms and is removed either continuously or periodically. However, a part of this flocculous concentration is continuously drawn back into the system employing suction produced by the rotary motion of the water to suck the sludge along a tube into the reaction chamber wherein the sludge particles form cores of new, larger particles whereby larger and more readily separating settleables are obtained. Here mention is made of the following advantages of the present method as compared with those of prior known methods:

(1) Both the reaction period and clarification period shorten markedly so that smaller units than hitherto can be employed and consequently building and installation costs decrease.

(2) the consumption of chemicals decreases wherefore operating costs are reduced.

(3) Movable parts such as motor driven rotary agitators are unnecessary.

(4) Secondary currents occurring in horizontal tanks and hindering clarification are eliminated.

(5) Enlargement of plant is simplified as enlargement implies the addition of complete units.

(6) In small-sized plants the apparatus can be constructed so as to operate under pressure wherefore double pumping is unnecessary.

In the method operating under pressure the end plates chiefly limit the size of the apparatus. However, the pressure exerted on the end-plates can be appreciably diminished by fixing an inner cylindrical construction accommodating the sand filter and reaction zone to the end-plates of the tank.

The invention will be more readily understood by reference to the accompanying drawing which illustrates preferred embodiments of both open and pressure operated apparata.

Fig. 1 is a vertical section of an apparatus for the open tank method.

Fig. 2 is a section taken along line 2—2 of the apparatus disclosed in Fig. 1.

Fig. 3 is a horizontal projection of the apparatus shown in Fig. 1.

Fig. 4 is a vertical section of an apparatus for the method under pressure.

Figs. 5 and 6 are sections taken along lines 5—5 and 6—6 of the apparatus shown in Fig. 4. In the drawing similar reference characters indicate similar parts in the several figures.

Raw water admixed with chemicals is conducted along conduit 1 tangentially into the cylindrical construction 12 disposed centrally of the reaction zone 2 to effect vigorous circulatory motion and mixing. Concentrated sludge can also be introduced into the conduit 1 from the lower part of the clarification zone through the conduit 15 by means of an ejector. On the exterior side of the cylindrical construction 12 the rotary motion of the water progressively diminishes and the flocs formed coalesce in part at least. Now the water is caused to pass through suitably directioned apertures 14 (Fig. 1) or conduits 14 (Figs. 4 and 5) into the clarification zone 3 wherein the rotary motion in the lower part of the tank continues although diminishing progressively the whole while. In the lower part of the zone there is an upwardly turned truncated cone 8 on the exterior side of which the particles or flocs settle. In consequence of the circulatory motion of water no settling occurs within the truncated cone. From the upper part of the clarifying zone clear water flows over the weir 9 (Figs. 1 and 3), i. e., over the upper edge of the filter into the sand filter. In an apparatus operating under pressure the weir comprises perforated conduits 9 (Figs. 4 and 6). For the purpose of diminishing undesirable currents occurring in the clarification zone, in the open tank method, the length of the weir can be extended by means of channels 10 (Figs. 1 and 3). After having passed through the sand filter 4 the purified water is withdrawn from the apparatus along the conduit 5. The sand filter 4 is constructed in customary manner. For surface cleaning for instance a rotating jet rake 11 operated by pressure of rinsing water fed through the tube 7 can be employed. The rinsing water is withdrawn from the apparatus through the pipe 5. 13 is a perforated pipe.

I claim:

1. A water purification apparatus comprising, in combination, a cylindrical reaction chamber which receives raw water admixed with chemicals and which has a smaller cylindrical receiving chamber mounted therein and communicating therewith; a filter chamber superimposed upon said reaction chamber; an annular clarification chamber mounted about said reaction and filter chambers and communicating at a lower portion thereof with said reaction chamber so that the water may flow to said clarification chamber from said reaction chamber, said annular clarification chamber having a bottom surface and an annular wall extending upwardly from said bottom surface, said annular wall being inclined in a direction away from said reaction chamber, whereby the water leaving said reaction chamber flows upward toward the top of the clarification chamber through the space between the said annular wall and said reaction chamber and whereby the floc settling in said clarification chamber settles on the side of the annular wall distant from said reaction chamber; means for conveying the settled floc from said clarification chamber to said reaction chamber; means located about an upper portion of said filter chamber and communicating with said clarification chamber for permitting water in said clarification chamber to flow into said filter chamber, said means for permitting the water to flow from said clarification chamber to said filter chamber comprising an annular wall portion common to said filter chamber and clarification chamber which functions as a weir to permit the water in the clarification chamber to flow thereover and into the filter chamber when the water in the clarification chamber exceeds the level of said annular wall portion; means for introducing raw water with admixed chemicals therein into said reaction chamber comprising an inlet pipe communicating tangentially at its outlet with said smaller cylindrical receiving chamber; and means for withdrawing purified water from said filter chamber.

2. A water purification apparatus comprising, in combination, a cylindrical reaction chamber which receives raw water admixed with chemicals and which has a smaller cylindrical receiving chamber mounted therein and communicating therewith; a filter chamber superimposed upon said reaction chamber; an annular clarification chamber mounted about said reaction and filter chambers and communicating at a lower portion thereof with said reaction chamber so that the water may flow to said clarification chamber from said reaction chamber, said annular clarification chamber having a bottom surface and an annular wall extending upwardly from said bottom surface, said annular wall being inclined in a direction away from said reaction chamber, whereby the water leaving said reaction chamber flows upward toward the top of the clarification chamber through the space between the said annular wall and said reaction chamber and whereby the floc settling in said clarification chamber settles on the side of the annular wall distant from said reaction chamber; means for conveying the settled floc from said clarification chamber to said reaction chamber; means located about an upper portion of said filter chamber and communicating with said clarification chamber for permitting water in said clarification chamber to flow into said filter chamber, said means for permitting the water to flow from said clarification chamber to said filter chamber comprising a plurality of pipes having discharge ends located over said filter chamber and having perforated wall portions located in said clarification chamber; means for introducing raw water with admixed chemicals therein into said reaction chamber comprising an inlet pipe communicating tangentially at its outlet with said smaller cylindrical receiving chamber; and means for withdrawing purified water from said filter chamber.

OSMO MAKKONEN.

REFERENCES CITED

The following references are of record in the file of this patent:

UNITED STATES PATENTS

| Number | Name | Date |
|---|---|---|
| 748,308 | Reisert | Dec. 29, 1903 |
| 1,158,225 | Jewell | Oct. 26, 1915 |
| 2,129,181 | Morse | Sept. 6, 1938 |
| 2,275,954 | Gibson | Mar. 10, 1942 |
| 2,317,847 | Duden | Apr. 27, 1943 |
| 2,355,564 | Sebald | Aug. 8, 1944 |
| 2,382,490 | Lawlor | Aug. 14, 1945 |
| 2,391,697 | Green | Dec. 25, 1945 |
| 2,401,924 | Goetz | June 11, 1946 |
| 2,407,947 | Butcher | Sept. 17, 1946 |
| 2,442,809 | Hallier et al. | June 8, 1948 |

FOREIGN PATENTS

| Number | Country | Date |
|---|---|---|
| 488,433 | France | June 27, 1918 |